(12) United States Patent
Cook et al.

(10) Patent No.: US 6,674,479 B2
(45) Date of Patent: Jan. 6, 2004

(54) METHOD AND APPARATUS FOR IMPLEMENTING 4:2:0 TO 4:2:2 AND 4:2:2 TO 4:2:0 COLOR SPACE CONVERSION

(75) Inventors: Val Cook, Shingle Springs, CA (US); Kam Leung, El Dorado Hills, CA (US); Wing Hang Wong, Folsom, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/478,793

(22) Filed: Jan. 7, 2000

(65) Prior Publication Data

US 2002/0101536 A1 Aug. 1, 2002

(51) Int. Cl.[7] .............................. H04N 7/01; H04N 9/64; H04N 9/67; H04N 11/20
(52) U.S. Cl. ..................... 348/453; 348/488; 382/165; 345/600
(58) Field of Search ................ 348/450, 453, 348/659, 660, 708, 557, 599, 488, 716, 717, 663, 661, 234, 235; 382/165, 166, 167; 345/153, 155, 156, 600, 603, 604, 605; H04N 7/01, 11/20, 9/67, 9/64

(56) References Cited

U.S. PATENT DOCUMENTS

| | | | | |
|---|---|---|---|---|
| 5,550,597 A | * | 8/1996 | Wada et al. ............... 348/708 |
| 5,568,204 A | * | 10/1996 | Takamori ................... 348/705 |
| 5,650,824 A | * | 7/1997 | Huang ........................ 348/453 |
| 5,684,544 A | * | 11/1997 | Astle .......................... 348/708 |
| 5,790,197 A | * | 8/1998 | Canfield ..................... 348/453 |
| 5,812,204 A | * | 9/1998 | Baker et al. ................ 348/453 |
| 5,832,120 A | * | 11/1998 | Prabhakar et al. .......... 382/233 |
| 5,982,432 A | * | 11/1999 | Uenoyama et al. ......... 348/391 |
| 6,005,546 A | * | 12/1999 | Keene ........................ 345/531 |
| 6,205,181 B1 | * | 3/2001 | Hu et al. .................... 348/717 |
| 6,208,350 B1 | * | 3/2001 | Herrera ...................... 345/430 |
| 6,353,440 B1 | * | 3/2002 | Keene ........................ 345/603 |
| 6,445,386 B1 | * | 9/2002 | Cook et al. ................. 345/419 |
| 6,452,601 B1 | * | 9/2002 | Marino et al. .............. 345/538 |
| 6,529,244 B1 | * | 3/2003 | Hrusecky .................... 348/453 |

* cited by examiner

Primary Examiner—John Miller
Assistant Examiner—Brian Yenke
(74) Attorney, Agent, or Firm—Schwegman, Lundberg, Woessner & Kluth, P.A.

(57) ABSTRACT

A method and circuit are provided for color space conversion of Y (luminance) and UV (chrominance) components from a planar YUV 4:2:0 format to an interleaved, or packed YUV 4:2:2 format, and from an interleaved, or packed YUV 4:2:2 format to a planar YUV 4:2:0 format. The method for both conversions includes reading source data, interpolating the sampled YUV component values, and performing a pass to thereby write the converted YUV component values in three passes, one pass for all values of the respective YUV components.

39 Claims, 15 Drawing Sheets

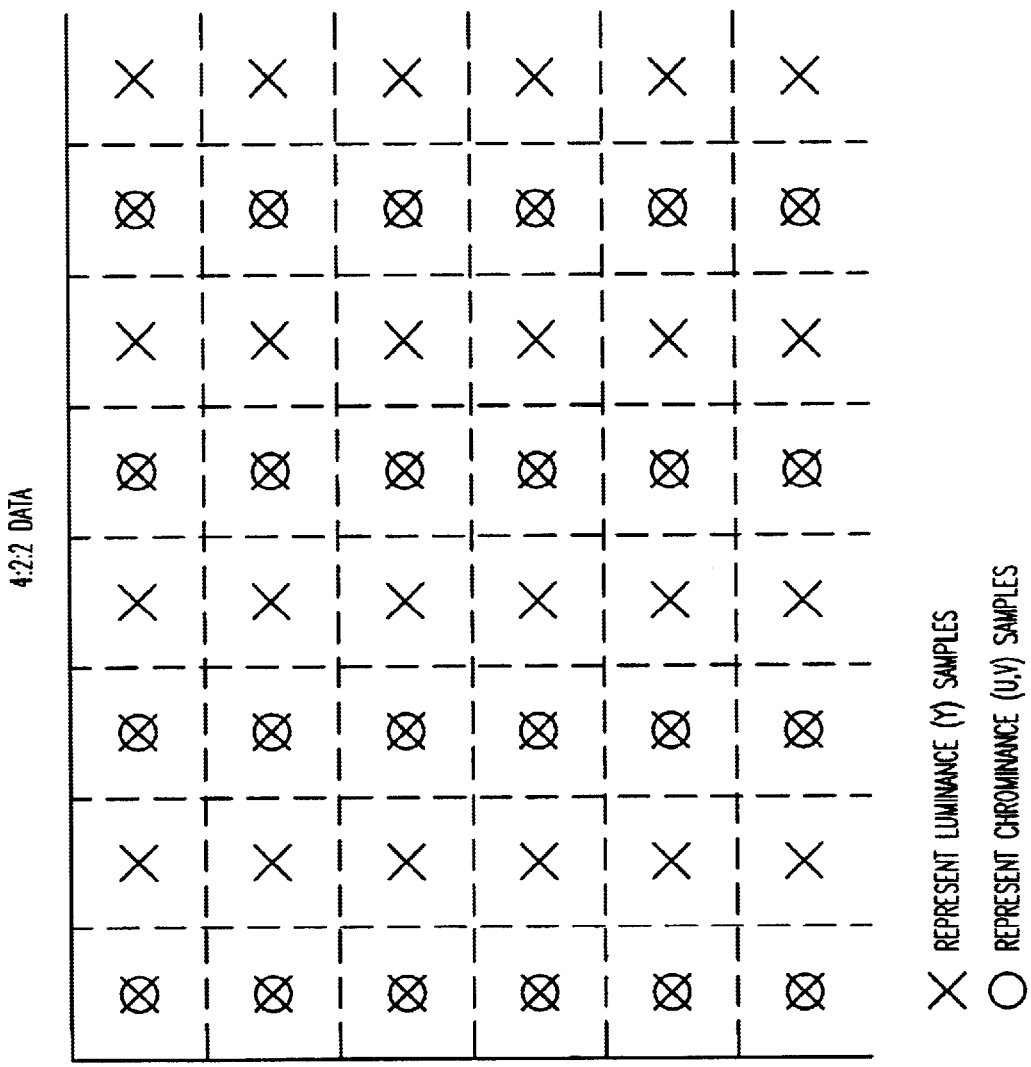

EXAMPLE EQUATIONS:
$Y'_{00} = Y_{00}$   $U'_{10} = (0.25)U_{20} + (1-0.25)U_{00}$
$Y'_{77} = Y_{77}$   $U'_{20} = (0.75)U_{20} + (1-0.75)U_{00}$

GENERAL CASE   GENERAL CASE
$Y'_{ij} = Y_{ij}$   $U' = \alpha U_{LOWER} + (1-\alpha)U_{UPPER}$

BYTE MASKING FOR 4:2:0 TO 4:2:2 CONVERSION

ASSUMING THE CURRENT PASS IS FOR U

| DATA | Y | Y | U | Y | V |
|---|---|---|---|---|---|
| BYTE MASK U | OFF 0 | OFF 0 | ON 1 | OFF 0 | OFF 0 |

ASSUMING THE CURRENT PASS IS FOR V

| DATA | Y | Y | U | Y | V |
|---|---|---|---|---|---|
| BYTE MASK V | OFF 0 | OFF 0 | OFF 0 | OFF 0 | ON 1 |

ASSUMING THE CURRENT PASS IS FOR Y

| DATA | Y | Y | U | Y | V |
|---|---|---|---|---|---|
| BYTE MASK Y | ON 1 | ON 1 | OFF 0 | ON 1 | OFF 0 |

YUV PASSES USING BYTE MASKS

Fig. 6C

METHOD AND APPARATUS FOR IMPLEMENTING 4:2:0 TO 4:2:2 AND 4:2:2 TO 4:2:0 COLOR SPACE CONVERSION

FIELD

The present invention relates to the field of YUV color space conversion from planar YUV 4:2:0 format to packed 4:2:2 YUV format and packed 4:2:2 YUV format to planar YUV 4:2:0 format.

BACKGROUND

Conversion of digital data from planar YUV 4:2:0 format to packed YUV 4:2:2 format has been performed for graphics generation and digital video processing since packed YUV 4:2:2 format provides a more detailed, richer display. Conversely, digital playback has typically been performed in a planar YUV 4:2:0 format which is a more compact format requiring less bandwidth.

4:2:0 color space data is stored in a planar format, that is, in three contiguous locations, or surfaces, of memory. Therefore, in order to convert YUV color space from 4:2:0 to 4:2:2, it has been necessary to read all three surfaces, for the Y, U and V components respectively, convert the data and write the data in the converted format. Such processing incurs high overhead, in terms of address generation capabilities, buffering capacities, and data paths/streams to and from a memory. Furthermore, for the conversion of YUV 4:2:2 packed format data to the YUV 4:2:0 planar format, the converted data is required to be written to the three separate, memory locations which also requires additional buffering capabilities and data paths/streams to and from the memory.

Therefore, there exists a need for a simpler and less expensive technique for performing color conversions.

SUMMARY

According to an embodiment of the present invention, a method and circuit are provided for color space conversion of YUV (luminance and chrominance) components, including the steps of reading source data, sampling said YUV samples in a vertical direction, performing a pass for each of said Y, U and V components, and writing said YUV components in the converted format.

BRIEF DESCRIPTION OF THE DRAWINGS

The foregoing and a better understanding of the present invention will become apparent from the following detailed description of example embodiments and the claims when read in connection with the accompanying drawings, all forming a part of the disclosure of this invention. While the foregoing and following written disclosure focuses on disclosing example embodiments of this invention, it should be clearly understood that the same is by way of illustration and example only and the invention is not limited thereto. The spirit and scope of the present invention are limited only by the terms of the appended claims.

The following represents brief descriptions of the drawings, wherein:

FIG. 4 shows an example sampling grid of 4:2:2 YUV color space data;

FIG. 6C shows Byte Mastering for 4:2:0 to 4:2:2 conversion;

DETAILED DESCRIPTION

Figure 1:
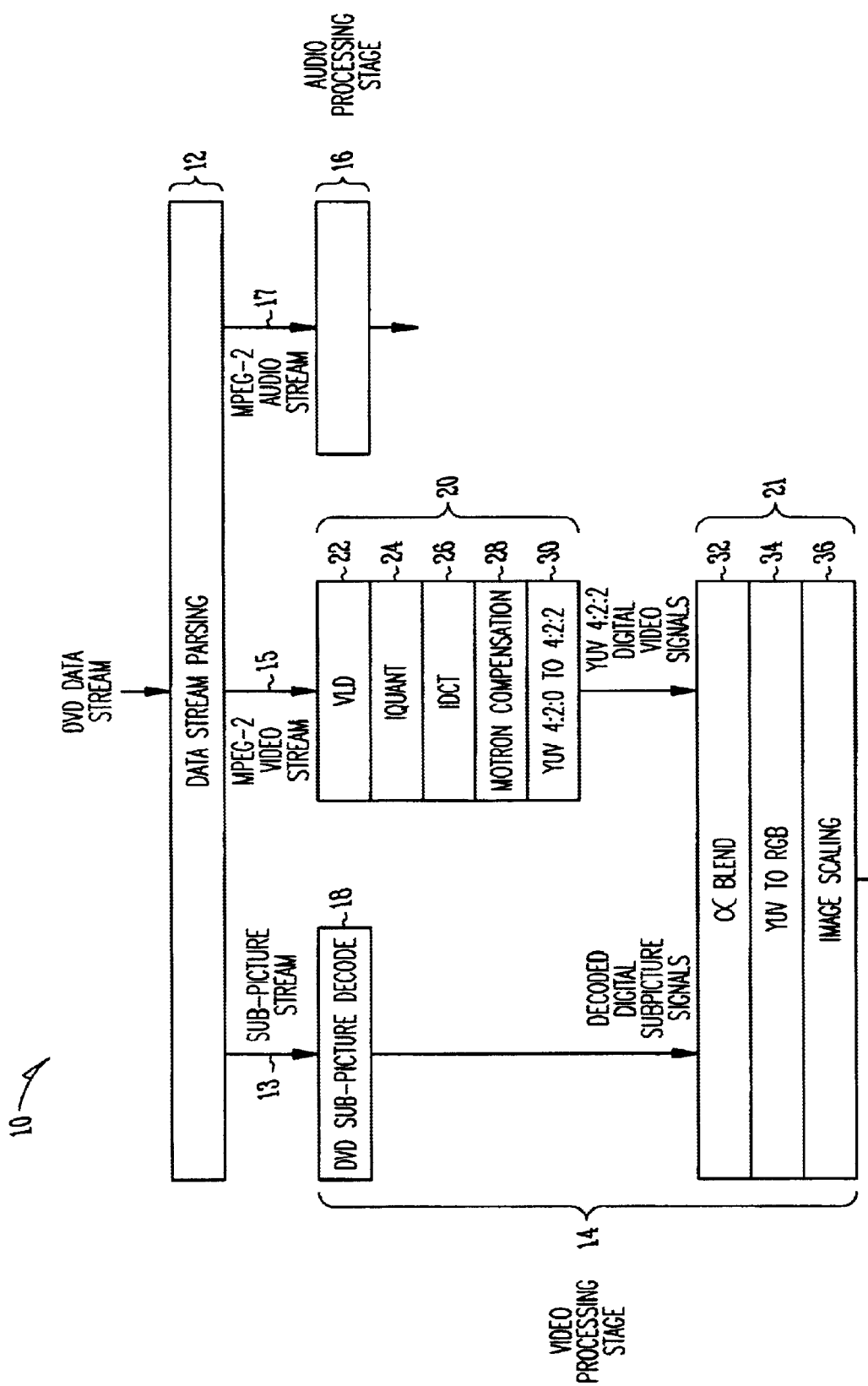
FIG. 1 is an example block diagram illustrating an example of a DVD data stream processing pipeline.

Before beginning a detailed description of the invention, it should be noted that, when appropriate, like reference numerals and characters may be used to designate identical, corresponding or similar components in differing figure drawings. Further, in the detailed description to follow, example embodiments and values may be given, although the present invention is not limited thereto.

The emergence of Digital Versatile Disk (DVD) (also known as Digital Video Disk) has allowed personal computer (PC) manufacturers to provide a more effective multimedia PC for delivering video and audio information to users. It also presents a significant technical challenge in the highly price-competitive PC market to provide PCs capable of providing high performance video and audio while maintaining a low cost.

A DVD data stream can contain several types of packetized streams, including video, audio, subpicture, presentation and control information, and data search information (DSI). DVD supports up to 32 subpicture streams that overlay the video to provide subtitles, captions, karaoke, lyrics, menus, simple animation and other graphical overlays. According to the DVD specification, the subpictures are intended to be blended with the video for a translucent overlay in the final digital video signal.

FIG. 1 is a block diagram illustrating a typical DVD data stream processing pipeline 10. The video and audio streams are compressed according to the Moving Pictures Experts Group MPEG-2 standard. Additional information regarding the DVD processing can be found in the DVD Specification, Version 1.0, August, 1996; and additional information regarding the MPEG-2 standard can be found, for example, in MPEG Video Standard: ISO/IEC 13818-2: Information Technology—Generic Coding of Moving Pictures and Associated Audio Information: Video (1996) (a.k.a. ITU-T Rec. H-262 (1996)). A discussion of a typical DVD data stream processing is also provided in published PCT application No. WO 99/23831.

Referring to FIG. 1 again, in data stream parsing stage 12, an incoming DVD data stream is parsed or split (i.e., demultiplexed) into multiple independent streams, including a subpicture stream 13, a MPEG-2 video stream 15 and a MPEG-2 audio stream 17. The MPEG-2 video stream 15 and the subpicture stream 13 are provided to a video processing stage 14. Similarly, the MPEG-2 audio stream is provided to an audio processing stage 16.

Video processing stage 14, as depicted in FIG. 1, may include three sub-stages (sub-stages 18, 20 and 21). The first sub-stage is a DVD subpicture decode stage 18 in which the subpicture stream is decoded into a two-dimensional array of subpicture values. Each subpicture value includes an index into a subpicture palette a and a corresponding alpha value. The indices identify Y, U and V values of the subpicture pixels. The alpha values are used for blending or image compositing the subpicture signal and the video signal. As a result, the subpicture data may be considered as being provided in a YUV 4:4:4 format (the palette contains the YUV 4:4:4 values or color codes for the subpicture signal). YUV is a color-difference video signal containing one luminance value (Y) or component and two chrominance values (U, V) or components, and is also commonly referred to as YCrCb (where Cr and Cb are chrominance values corresponding to U and V). The terms YUV and YCrCb can be used interchangeably. YUV 4:4:4 is a component digital video format in which each of the luminance and chrominance values are sampled equally (e.g., one Y value, one U value and one V value per pixel).

The second sub-stage of video processing stage 14 is an MPEG-2 video decode sub-stage 20 in which the MPEG-2 video stream is decoded and decompressed and converted to a YUV 4:2:2 digital video signal. The incoming DVD video signals in the DVD data stream are decoded into a planar YUV 4:2:0 format. In accordance with the MPEG-2 specification, MPEG-2 decode sub-stage 20 then conducts a variable length decode (VLD) 22, an inverse quantization (IQUANT) 24, an Inverse Discrete Cosine Transform (IDCT) 26 and motion compensation 28.

As noted, the incoming DVD video signals in the DVD data stream are decoded into a planar YUV 4:2:0 format. Also, planar YUV 4:2:0 format is the digital component format used to perform the MPEG-2 motion compensation, stage 28. However, a subsequent alpha-blending stage 32 is typically performed in packed YUV 4:2:2 format. Therefore, after motion compensation 28, a conversion stage 30 is used to convert the digital video data from a planar YUV 4:2:0 format to an interleaved (or packed) YUV 4:2:2 format.

Figure 3A:
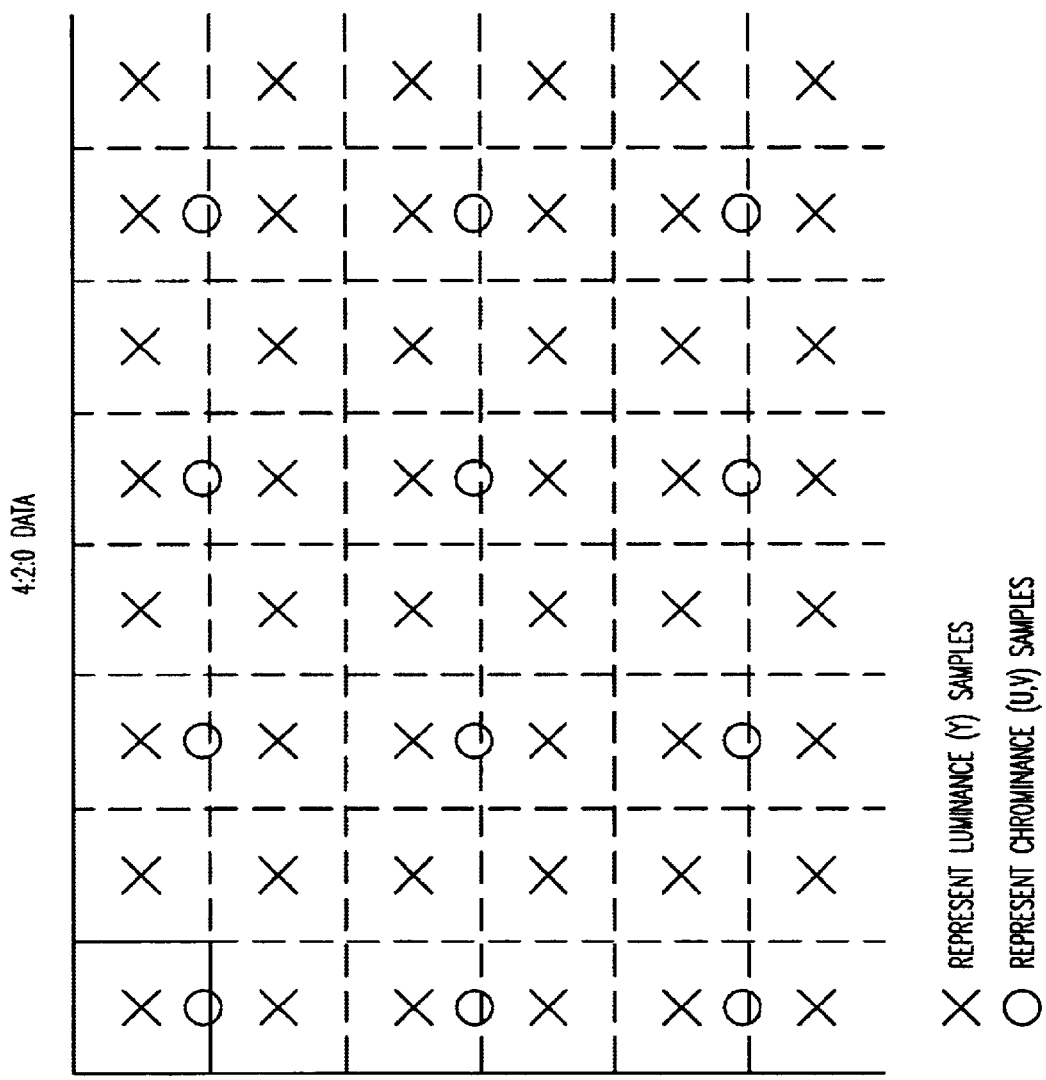
FIG. 3A shows an example sampling grid of 4:2:0 color space data.
Figure 3B:
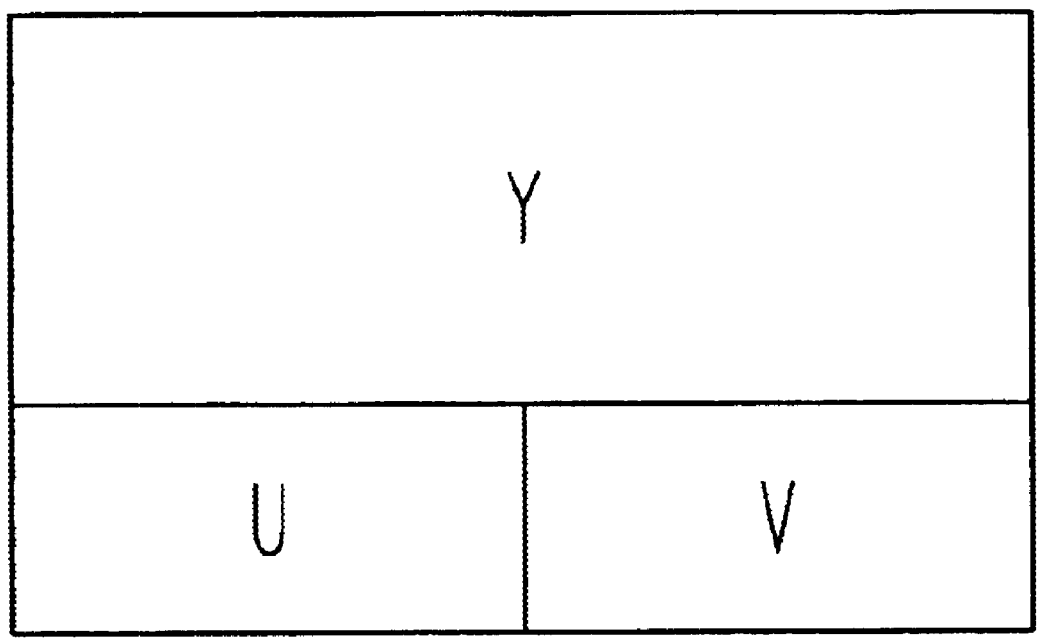
FIG. 3B shows an example of planar YUV 4:2:0 format color space data as it is stored in a planar format.

The interleaved (or packed) format is where the Y, U and V samples are provided or stored in an interleaved arrangement (e.g., YUVYUVYUV . . . ). The planar format is where a group of Y samples (e.g., for a frame) are provided or stored together (typically contiguously) in a surface or set of buffers, a group of U samples are provided or stored together (typically contiguously) in a second surface or a second set of memory buffers, and the V samples are stored together (typically contiguously) in a third surface or set of buffers. Thus, in the planar format, as shown in FIG. 3B, the sets of Y, U and V samples are stored in separate surfaces (or separate sets of buffers or separate regions in memory).

As shown in the YUV 4:2:2 sampling grid of FIG. 4, in the packed YUV 4:2:2 format, there is one pair of chrominance samples (UV, represented by O in the figure) for two luminance samples (Y, represented by X in the figure), that is, chrominance samples U, V are shared across two pixels. This is done by a 2:1 horizontal downsampling of the YUV 4:4:4 chrominance samples. In YUV 4:2:0, there is both a horizontal 2:1 downsampling and a vertical 2:1 downsampling of the chrominance samples (UV). Thus, as shown in the YUV 4:2:0 sampling grid of FIG. 3A, in the planar YUV 4:2:0 format, one pair of chrominance samples (UV) are shared for four pixels (while each pixel includes its own luminance sample, Y).

Since the human eye is more sensitive to brightness than color, rather than sampling the Y, U and V samples equally (as in YUV 4:4:4), a video frame can be compressed without a significant perceived loss in quality by compressing only the color or chrominance information (e.g., resulting in a packed YUV 4:2:2 format, or even a planar YUV 4:2:0 format). As a result, compression can be achieved by downsampling the chrominance samples horizontally (for a packed YUV 4:2:2 format) or by downsampling the chrominance samples both horizontally and vertically (for the planar YUV 4:2:0 format). Referring to FIG. 1 again, the resulting YUV 4:2:2 decoded video signals are provided to a third sub-stage 21 where the YUV 4:2:2 video signals and the subpicture signals are blended together in an alpha blend process 32 (or image compositing process) to produce a video signal having a translucent overlay. Next the blended video signal is converted from YUV 4:2:2 to YUV 4:4:4 (not shown), and then provided to a YUV-to-RGB conversion process 34, in which the blended digital video signal is converted from a YUV 4:4:4 format to a (red-green-blue) RGB format, which is compatible with a cathode ray tube (CRT) display or other display. An image scaling process 36 may then be performed to scale the image to a particular size for display. The RGB signal may be converted to an analog signal if required by the display or receiving device. The scaled RGB signal is then provided to a display or provided to other devices for recording, etc.

The MPEG-2 motion compensation sub-stage 28 will be briefly discussed. MPEG-2 video performs image compression using motion compensation and motion estimation. Since motion video is a sequence of still pictures or frames, many of which are very similar, each picture can be compared to the pictures adjacent in time. The MPEG encoding process breaks each picture into regions, called macroblocks, then hunts around in neighboring pictures for similar blocks. Then instead of storing the entire block, the system stores a much smaller pointer called a motion vector describing how far the block has moved (or didn't move) between the pictures. In this manner, one block or even a large group of blocks that move together can be efficiently compressed.

MPEG-2 uses three kinds of pictures. Intra pictures (I frames) are pictures in which the entire picture is compressed and stored with DCT quantization. This I frame creates a reference frame from which successive pictures are built. Predicted pictures (P frames) contain motion vectors describing the difference from the closest I frame or P frame. If the frame has changed slightly in intensity (luminance) or color (chrominance), then this difference is also encoded. If something new appears which does not match previous blocks, a new block is stored in the same way an I frame is stored. Thus, P frames also operate as reference frames for building additional frames. A third type of frame is a bidirectional picture (B frame), where the system looks forward and backward to match blocks to the closest I frame and/or P frame. B frames do not function as reference frames.

The processing stages/substages associated with DVD processing pipeline 10 tend to be extremely compute intensive. In particular, the MPEG-2 decode stages, including the motion compensation 28, tend to be the most compute intensive stages. An important consideration for PC manufacturers in providing DVD capabilities is cost. Because the DVD processes are compute intensive, there is a need to provide cost-effective solutions that reduce the costs associated with the various stages and substages of the DVD processing pipeline. In a computer system, the processor typically executes software to perform some if not all of the DVD processing. While this may be relatively inexpensive because no specialized DVD hardware is necessary, such a solution can overburden the processor and results in a "jerky" frame rate or dropped frames which are very noticeable and generally considered unacceptable. As described below, according to an embodiment of the invention, one or more functions in the DVD pipeline can be performed in hardware to provide increased performance. As described below in detail, several new techniques are used to decrease hardware complexity and cost while maintaining adequate DVD quality and performance.

Although example embodiments of the present invention will be described using an example system block diagram in an example personal computer (PC) system or environment, practice of the invention is not limited thereto, i.e., the invention may be practiced with other types of systems, and in other types of environments.

Figure 2:
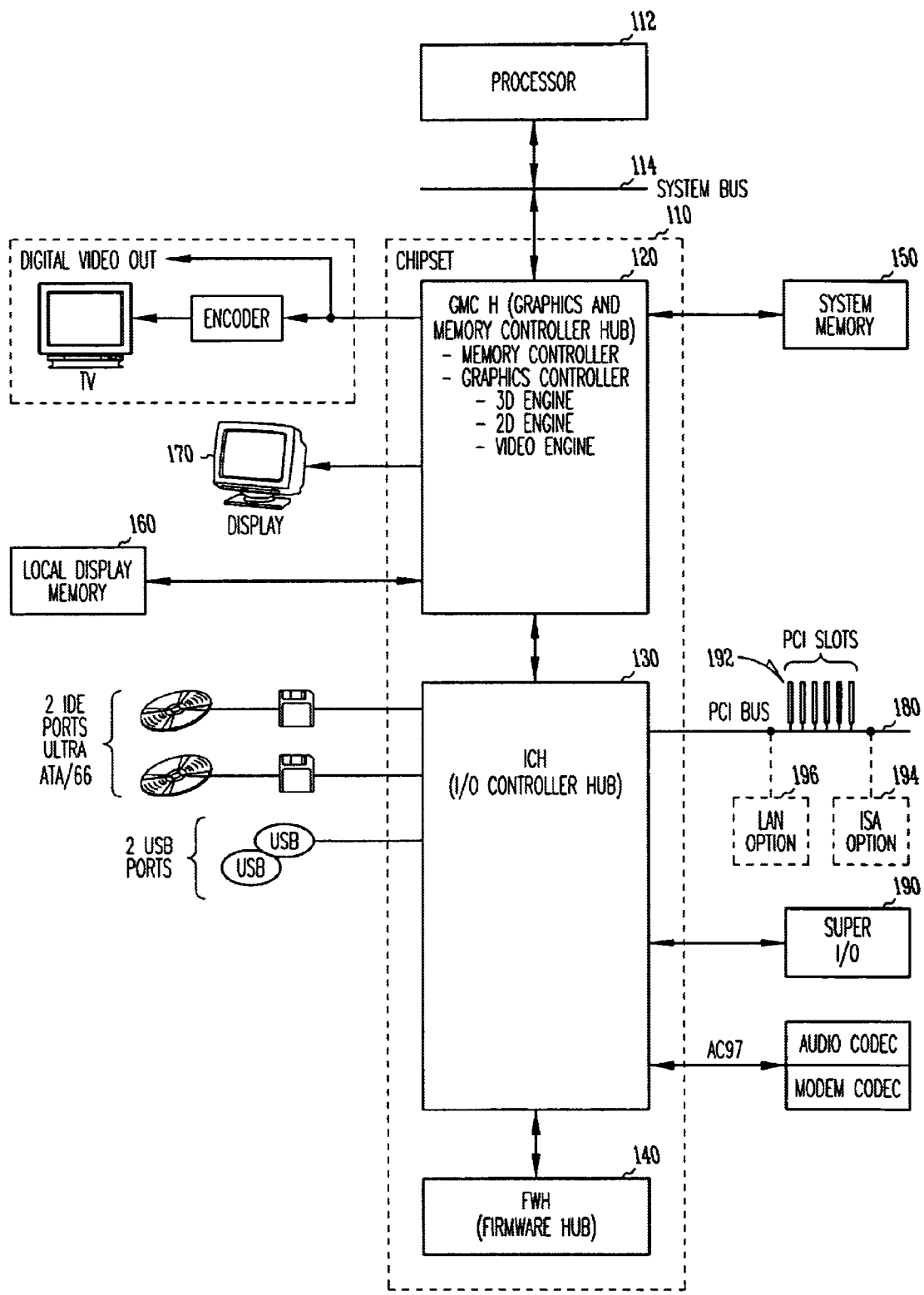
FIG. 2 is an example block diagram illustrating an example of an personal computer (PC) system according to an example embodiment of the present invention.

Referring to the figures in which like numerals indicate like elements, FIG. 2 is a block diagram illustrating an example personal computer (PC) system. Included within such system may be a processor 112 (e.g., an Intel® Celeron® processor) connected to a system bus 114. A chipset 110 is also connected to system bus 114. Although only one processor 112 is shown, multiple processors may be connected to system bus 114. In an example embodiment, the chipset 110 may be a highly-integrated three-chip solution including a graphics and memory controller hub (GMCH) 120, an input/output (I/O) controller hub(ICH) 130 and a firmware hub (FWH) 140.

The GMCH 120 provides graphics and video functions and interfaces one or more memory devices to the system bus 114. The GMCH 120 may include a memory controller as well as a graphics controller (which in turn may include a 3-dimensional (3D) engine, a 2-dimensional (2D) engine, and a video engine). GMCH 120 may be interconnected to any of a system memory 150, a local display memory 160, a display 170 (e.g., a computer monitor) and to a television (TV) via an encoder and a digital video output signal. GMCH 120 maybe, for example, an Intel® 82810 or 82810-DC100 chip. The GMCH 120 also operates as a bridge or interface for communications or signals sent between the processor 112 and one or more I/O devices which may be connected to ICH 140. As shown in FIG. 2, the GMCH 120 includes an integrated graphics controller and memory controller. However, the graphics controller and memory controller may be provided as separate components.

ICH 130 interfaces one or more I/O devices to GMCH 120. FWH 140 is connected to the ICH 130 and provides firmware for additional system control. The ICH 130 may be for example an Intel® 82801 chip and the FWH 140 may be for example an Intel® 82802 chip.

The ICH 130 may be connected to a variety of I/O devices and the like, such as: a Peripheral Component Interconnect (PCI) bus 180 (PCI Local Bus Specification Revision 2.2) which may have one or more I/O devices connected to PCI slots 192, an Industry Standard Architecture (ISA) bus option 194 and a local area network (LAN) option 196; a Super I/O chip 190 for connection to a mouse, keyboard and other peripheral devices (not shown); an audio coder/decoder (Codec) and modem Codec; a plurality of Universal Serial Bus (USB) ports (USB Specification, Revision 1.0); and a plurality of Ultra/66 AT Attachment (ATA) 2 ports (X3T9.2 948D specification; commonly also known as Integrated Drive Electronics (IDE) ports) for receiving one or more magnetic hard disk drives or other I/O devices.

One or more speakers are typically connected to the computer system for outputting sounds or audio information (speech, music, etc.). According to an embodiment, a compact disc(CD) player or preferably a Digital Video Disc (DVD) player is connected to the ICH 130 via one of the I/O ports (e.g., IDE ports, USB ports, PCI slots). The DVD player uses information encoded on a DVD disc to provide digital audio and video data streams and other information to allow the computer system to display and output a movie or other multimedia (e.g., audio and video) presentation.

Discussion now turns more specifically to the second sub-stage of video processing stage 14 in which the MPEG-2 video stream is decoded and decompressed and converted to a YUV 4:2:2 digital video signal, particularly conversion stage 30 (see FIG. 1) in which the digital video data is converted from a planar YUV 4:2:0 format to a packed YUV 4:2:2 format. Such conversion has application, for example, for video-conferencing display or the display of other network data which is usually transmitted in planar YUV 4:2:0 format but is displayed using a packed YUV 4:2:2 format. Further, the discussion of the present invention will also include the conversion of digital video data from the packed YUV 4:2:2 format to the planar YUV 4:2:0 format, which has application, for example, in DVD playback. It should be noted that for YUV 4:2:2 packed format, for which the following discussion pertains although the present invention is not limited thereto, data is written in double words which contain two pixels. A double word is 32 bits since a word is 16 bits.

An embodiment of the present invention utilizes multiple passes, one pass for all values of each of the respective YUV components, to thereby provide a low-cost conversion method for planar format (e.g., 4:2:0) to packed format (e.g., 4:2:2) having reduced overhead requirements. That is, by utilizing multiple passes, an embodiment of the present invention requires less extensive hardware than a single pass approach which would require that three separate streams of data (one for each of the YUV components, respectively) be input and processed in parallel. The single pass approach would require three separate circuits for addressing memory buffers, three separate circuits for routing or inputting the respective data streams, and three sets of temporary buffers for buffering the data during processing.

Planar 4:2:0 YUV color space data is stored in a planar format, that is, in three locations, or surfaces, of memory, as shown in FIG. 3B. Therefore, in order to convert YUV color space from planar YUV 4:2:0 format to packed YUV 4:2:2 format, it has been necessary to read all three surfaces, for the Y, U and V components respectively, convert the data and write the data to a double word of the converted packed YUV 4:2:2 format. As set forth above, such processing incurs high overhead, in terms of address generation capabilities, buffering capacities, and memory streams. Furthermore, for the conversion of packed YUV 4:2:2 format color space data, shown in FIG. 4, to the planar YUV 4:2:0 format color space data, the converted data is written to the three separate memory locations utilizing multiple passes, thereby requiring additional buffering capabilities and memory streams.

According to an embodiment of the present invention, for conversion of planar YUV 4:2:0 format data to packed YUV 4:2:2 format data, planar YUV 4:2:0 format source data may be read as texture stream data, and then three separate passes, including one pass for all values of each of the respective Y, U and V components, and byte masking, or logic packing, are executed in order to convert the planar YUV 4:2:0 format source data into packed YUV 4:2:2 format destination data, thus providing color space conversion at a lower cost with reduced overhead. Byte masking enables respective ones of the YUV components to be selectively written to memory, in converted form, without corrupting previously written component values.

In particular, the individual YUV values of the planar YUV 4:2:0 format source data are scaled to the resolution of the destination surface. Such scaling can be accomplished either by upsampling or downsampling the source data with a bilinear filter in both the vertical and horizontal directions, and the UV data is further adjusted by a half-pixel location to align with the sampling point of the packed YUV 4:2:2 format. Y data can be scaled without such a half-pixel adjustment. This process utilizes, for example, the example interpolation formula or conversion formula $\{\alpha\mu_1-(1-\alpha)\mu_0\}$ to determine the interpolated upsampled values of UV. The adjustments of the sampling points may be, but is not at all limited to, one half pixel position. The value "$\alpha$" indicates the offset of the sample in relation to the converted format, $\mu_1$ is the value of the lower component and $\mu_0$ is the value of the higher component. For example, to interpolate the new values of UV, represented by U', reference is made to the example of FIG. 6A. To arrive at the new value of UV at U'$_{10}$ in the 4:2:2 sampling grid 900, an interpolation utilizing the example interpolation or conversion formula $\{\alpha\mu_1-(1-\alpha)\mu_0\}$ must be made with $\mu_1$ representing the lower UV values U$_{20}$ in the 4:2:0 sampling grid 800 and $\mu_0$ representing the upper UV values U$_{00}$ at bit address Y$_{00}$ in the 4:2:0 sampling grid 800. The value "$\alpha$" in this example is 0.25, since the sampling point for the UV value represented by U"$_{10}$ in the 4:2:2 sampling grid 900 is offset downward by 0.25 pixel from the upper UV value represented by U$_{00}$ at bit address Y$_{00}$ in the 4:2:0 sampling grid 800. Thus, utilizing the interpolation or conversion formula $\{\alpha\mu_1-(1-\alpha)\mu_0\}$, the new chrominance values UV at U"$_{10}$ in the converted 4:2:2 sampling grid is interpolated as U"$_{10}$= (0.25)U$_{20}$+(1-0.25)U$_{00}$.

It should be noted that, in the present example of converting planar YUV 4:2:0 format data to packed YUV 4:2:2 format data, no interpolating or upsampling is necessary for the Y component values since the Y components are the same for both the planar YUV 4:2:0 and packed YUV 4:2:2 formats. However, practice of the present invention is not limited to embodiments where Y components are not interpolated, i.e., Y interpolation may be appropriate in some embodiments, e.g., for other types of format conversions.

Thus, an effect of scaling the YUV values by the bilinear filter is to produce data in the resolution of the destination surface whereby each double word pixel of 4 bytes and 32 bits is assigned one luminance (Y) and two chrominance samples (UV), in the manner of four bytes including a YUYV configuration. To thereby write the data into a double word of the converted packed YUV 4:2:2 format, byte masks are provided to the memory to perform the logic packing of a double word by which the components are written to memory. Logic packing utilizes byte masks which are logic configurations for selectively writing the respective YUV component values to the correspondingly appropriate bytes of the memory to thereby avoid corrupting the other component values. For example, Y components are written to memory using a "1010" byte mask, and therefore Y values will be written into the first and third bytes of the 4:2:2 double word while protecting the contents of the second and fourth bytes from overwriting; then the U components are written to memory using, for example, a "0100" byte mask so as not to corrupt the written Y components, and therefore U values will be written into the second byte of the 4:2:2 double word while protecting contents of the first, third and fourth bytes from overwriting; and lastly, the V components are written to the destination using, for example, a "0001" byte mask so as not to corrupt either of the written Y or U components, and therefore V values will be written into the fourth byte of the 4:2:2 double word while protecting the contents of the first, second and third bytes from overwriting. It should be noted that the individual passes for all of the values of the respective YUV components may be in any order, although the byte masks are provided similar to those described above so that the previously written components are not corrupted.

Figure 5A:
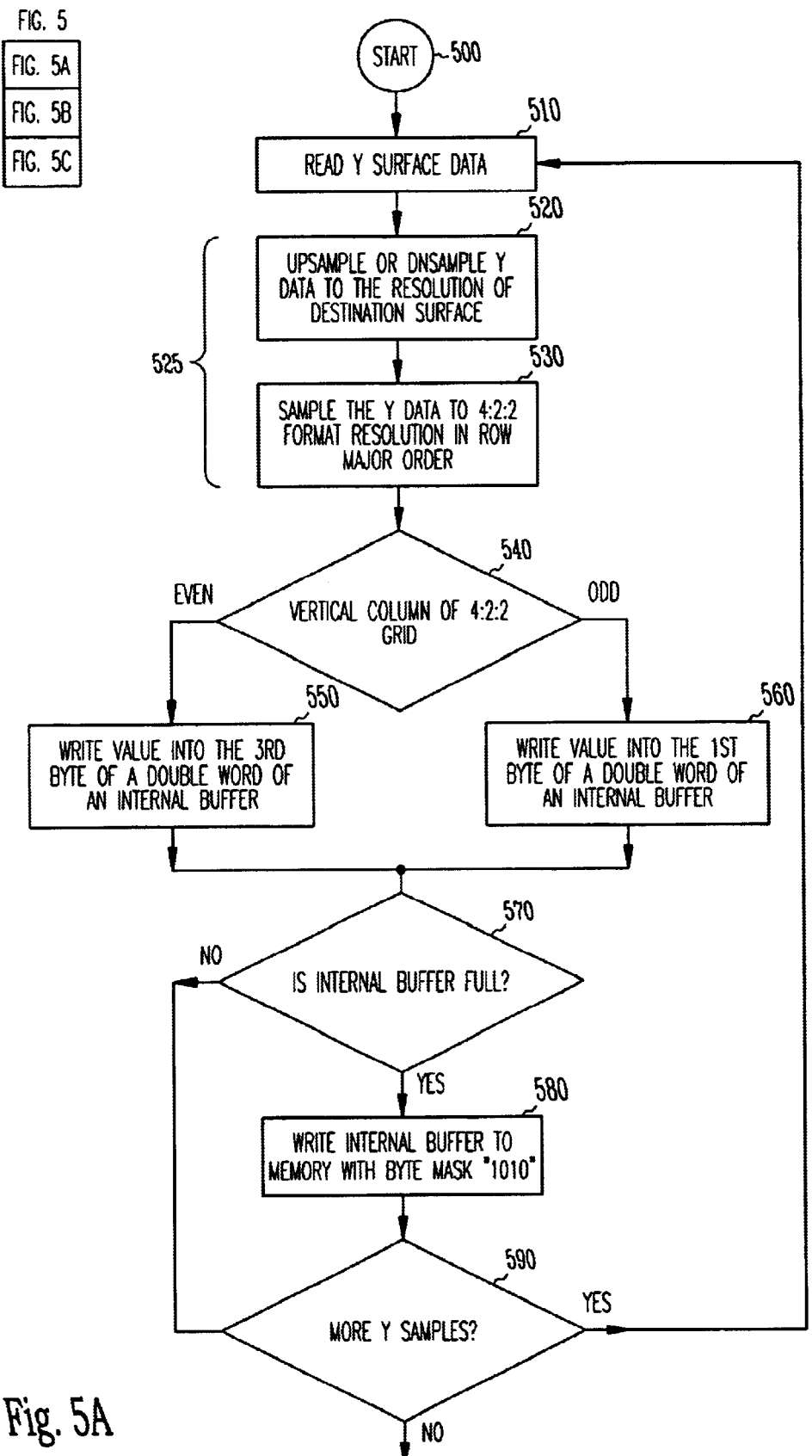
FIG. 5 shows an example flowchart of color space conversion from planar YUV 4:2:0 format to packed YUV 4:2:2 format according to an example embodiment of the present invention.
Figure 5B:
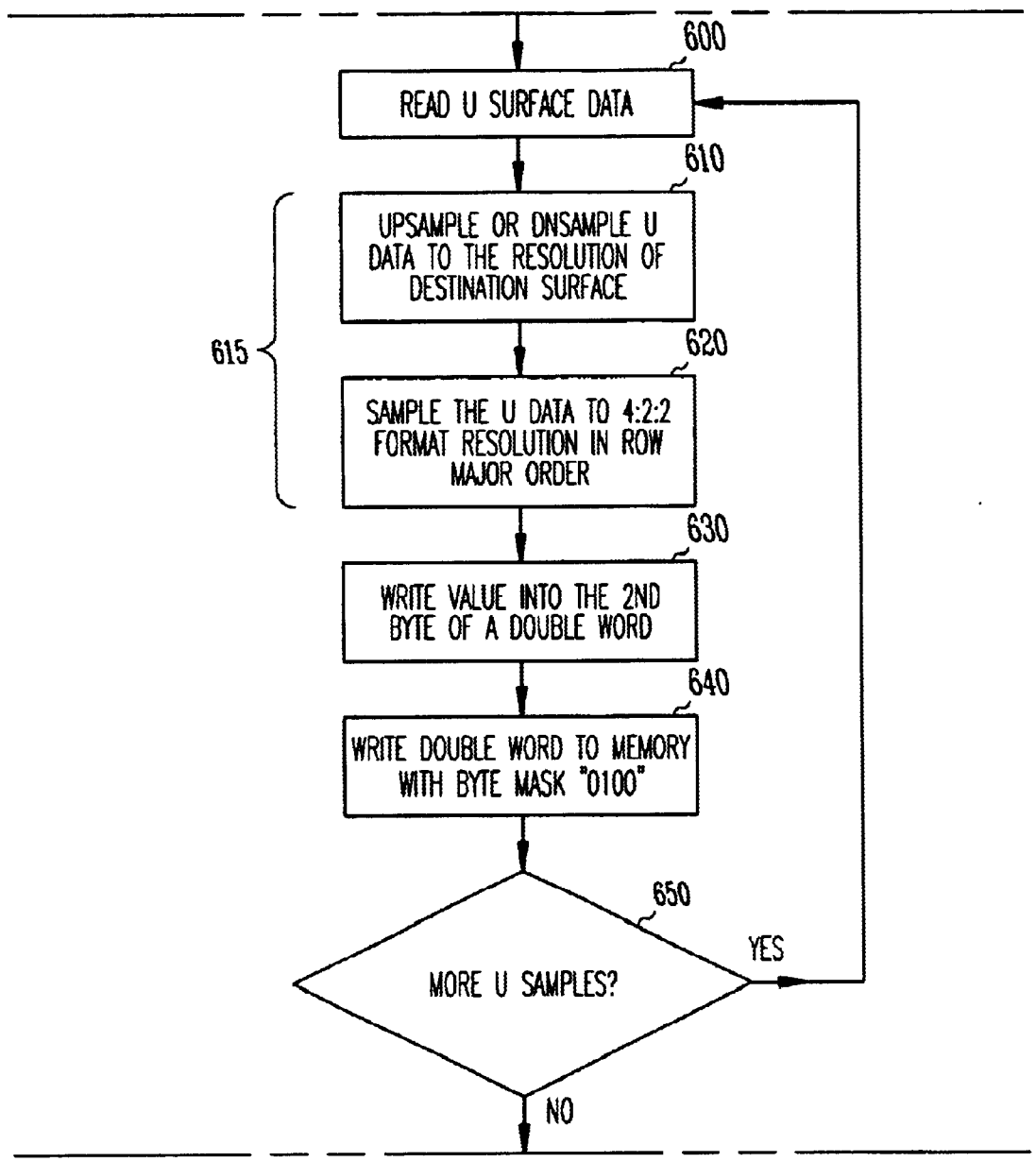
Figure 5C:
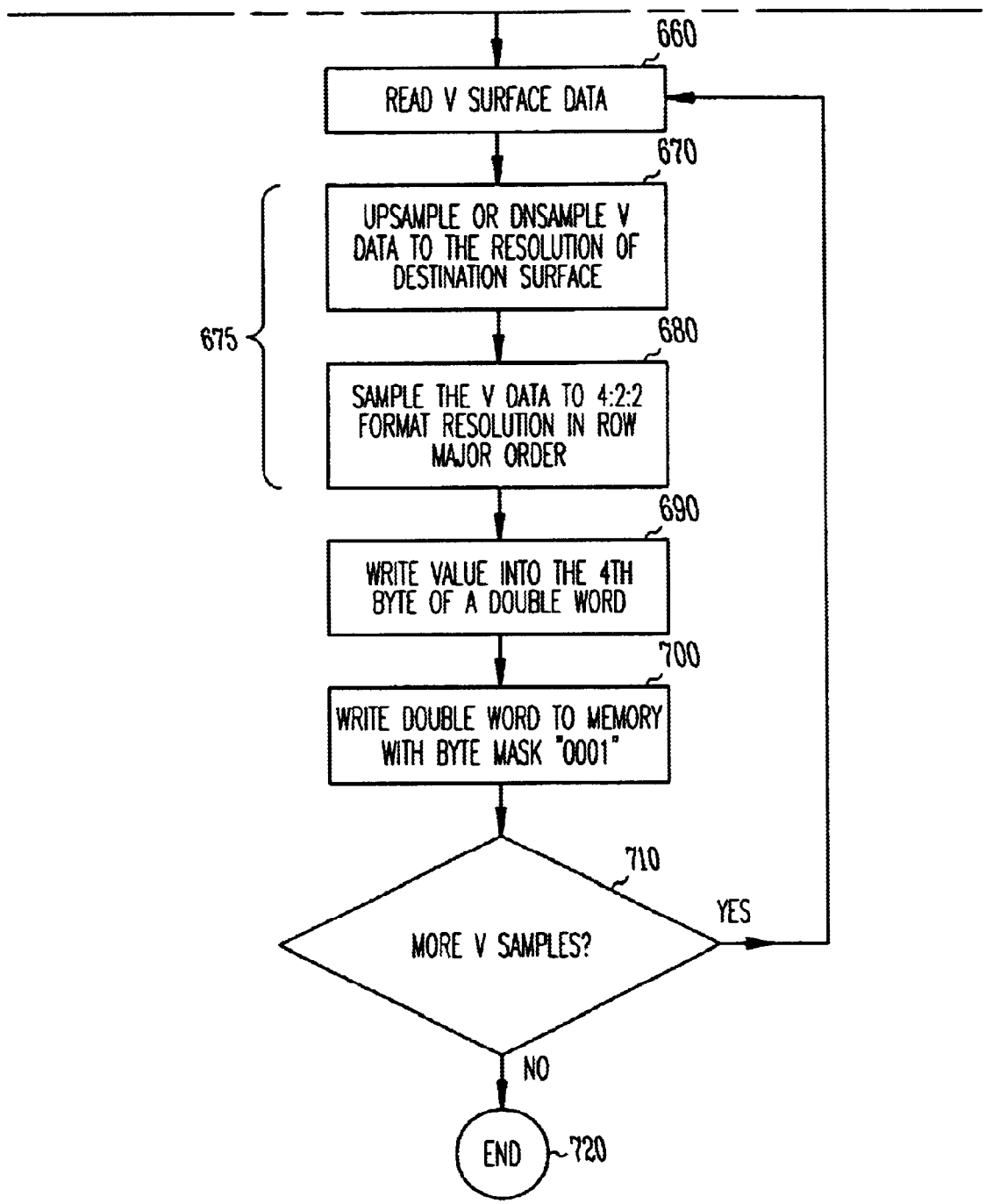
Figure 6A:
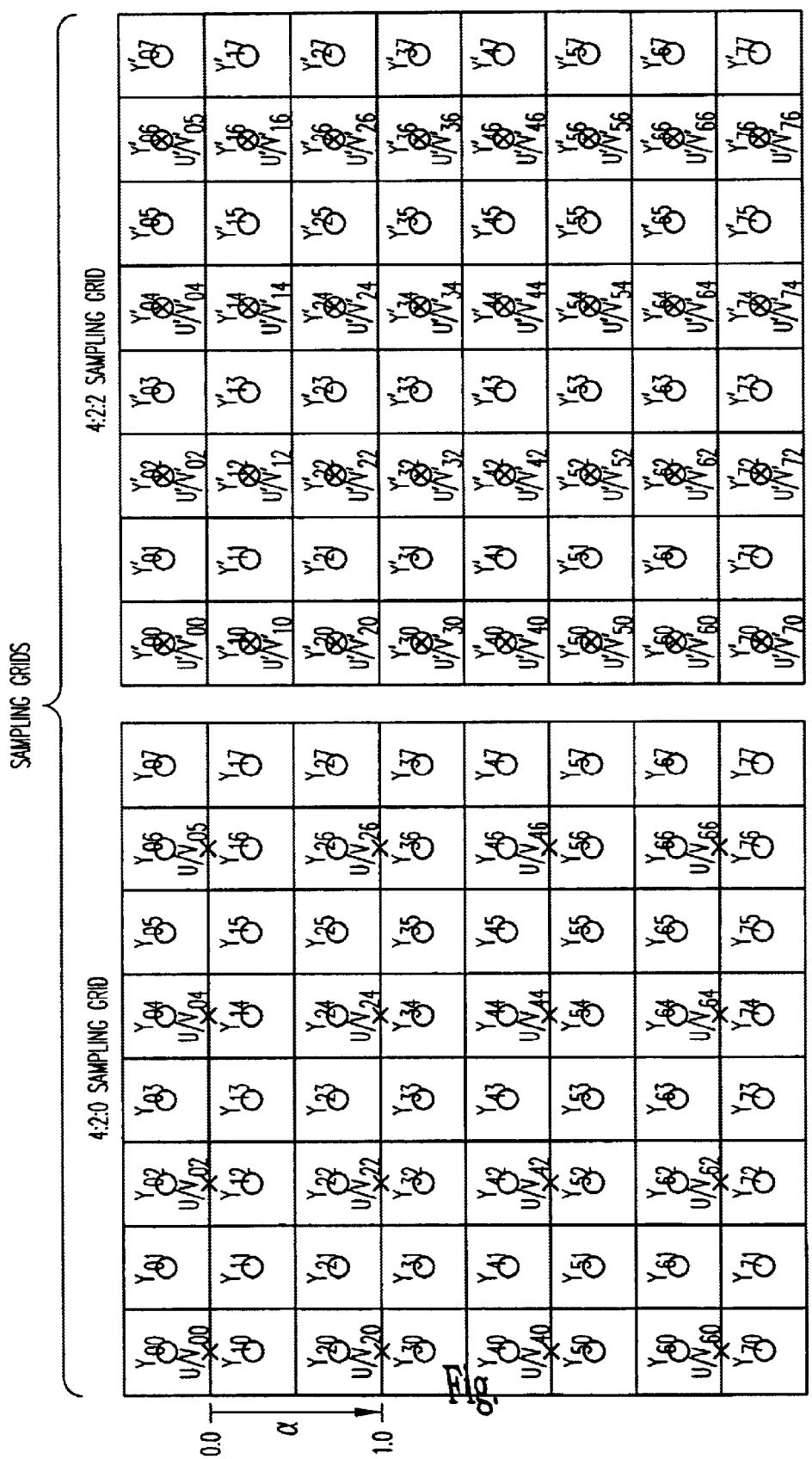
FIG. 6A shows example sampling grids relating to the example color space conversion from planar YUV 4:2:0 format to packed YUV 4:2:2 format shown in the example embodiment of the invention of FIG. 5.

Specifically, FIG. 5 shows a flow chart for converting planar YUV 4:2:0 format data to packed YUV 4:2:2 format data in accordance with the sample 4:2:0 and 4:2:2 sampling grids of FIG. 6A (800 and 900, respectively). An example of the byte masks used for such conversion is shown in FIG. 6C, with the masks being, for example, "0100" for the U pass, "0001" for the V pass, and "1010" for the Y pass.

Figure 6B:
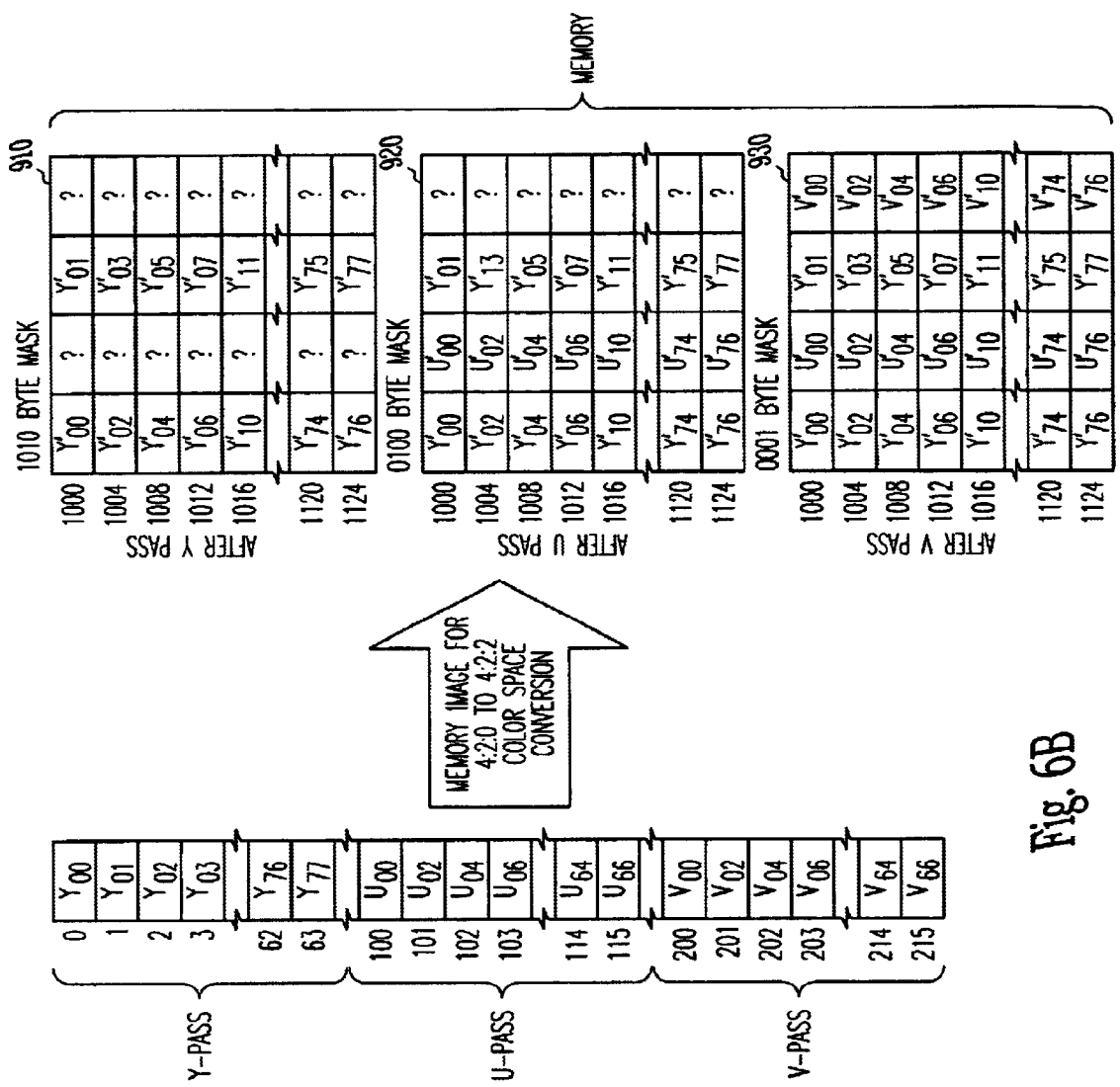
FIG. 6B shows example YUV data, respectively, as it is written to memory, after the respective passes, in accordance with the example of FIG. 6A.

Referring again to FIG. 5, after START 500, a Y pass is executed as a bilinear filter reads the incoming Y surface data (510). Then, the read Y data is interpolated (525) by utilizing the interpolation formula or conversion formula $\{\alpha\mu_1-(1-\alpha)\mu_0\}$ described above to perform a combination of functions including upsampling or downsampling the data to the resolution of the destination surface (520), and sampling the sample the Y data to the packed YUV 4:2:2 format resolution (530). That is, to scale the planar YUV 4:2:0 format data to the packed YUV 4:2:2 format data, the interpolation formula or conversion formula $\{\alpha\mu_1-(1-\alpha)\mu_0\}$ described above is utilized to determine the interpolated Y value appropriate for the packed YUV 4:2:2 format (525). However, in the present example, to which the present invention is not limited, no such sampling of the Y is necessary, since the Y values, in this simple example, are the same for both the planar YUV 4:2:0 format data and the packed YUV 4:2:2 format data. Thus, Y values are written to an internal buffer in the form of a packed YUV 4:2:2 format grid (900), with the even vertical columns thereof being written into the third byte of a double word in the internal buffer (550) and the odd vertical columns thereof being written into the first byte of the double word of the internal buffer (560). When the internal buffer is determined to be full (570), the Y data is written from the internal buffer to memory utilizing the mask "1010" (580), shown as "byte mask Y" in FIG. 6C. The writing of Y data to the memory is shown in block 910 of FIG. 6B. If the internal buffer is determined not to be full, any further 4:2:0 Y samples undergo the same processing described above (590).

A U pass is executed as a bilinear filter reads the incoming U surface data (600). Then, the read U data is interpolated (615) by utilizing the interpolation formula or conversion formula $\{\alpha\mu_1-(1-\alpha)\mu_0\}$ to perform the combination of upsampling or downsampling the data to the resolution of the destination surface (610), and sampling the U data to the packed YUV 4:2:2 format resolution (620). That is, as set forth above, to scale the planar YUV 4:2:0 format data to the packed YUV 4:2:2 format data, the interpolation formula or conversion formula $\{\alpha\mu_1-(1-\alpha)\mu_0\}$ described above is utilized to determine the interpolated U value appropriate for the packed YUV 4:2:2 format (615). Then, U values are written to the second byte of the double word in the internal buffer (630). The U data is written from the internal buffer to memory utilizing the mask "0100" (640), shown as "byte mask U" in FIG. 6C. The writing of U data to the memory is shown in block 920 of FIG. 6B. Any further 4:2:0 U samples undergo the same processing described above (650).

A V pass is executed as a bilinear filter reads the incoming V surface data (660). Then, the read V data is interpolated (675) by utilizing the interpolation formula or conversion formula $\{\alpha\mu_1-(1-\alpha)\mu_0\}$ to perform the combination of upsampling or downsampling the data to the resolution of the destination surface (670), and sampling the sample the V data to the packed YUV 4:2:2 format resolution (680). That is, to scale the planar YUV 4:2:0 format data to the packed YUV 4:2:2 format data, the interpolation formula or conversion formula $\{\alpha\mu_1-(1-\alpha)\mu_0\}$ is utilized to determine the interpolated V value appropriate for the packed YUV 4:2:2 format (675). Then, V values are written to the fourth byte of the double word in the internal buffer (690). The V data is written from the internal buffer to memory utilizing the mask "0001" (700), shown as "byte mask V" in FIG. 6C. The writing of V data to the memory is shown in block 930 of FIG. 6B. Any further 4:2:0 V samples undergo the same processing described above (710). Otherwise, the processing ends (720).

The result of the YUV passes is shown in the conversion from the 4:2:0 sampling grid 800 to the 4:2:2 sampling grid 900 shown in FIG. 6A, which is a memory composite of Y-grid 910, U-grid 920 and V-grid 930. Such result may be achieved using multiple passes through a single data stream, thus reducing costs and overhead, relative to previous conversion methods and circuits.

For conversion from packed YUV 4:2:2 format data to planar YUV 4:2:0 format data, once again three passes are required of the bilinear filter, one pass for all values of each of the respective YUV components. That is, in this conversion, the packed YUV 4:2:2 format data shown in FIG. 8, for example, may be read as texture stream data, and then three separate passes, including one pass for all values of each of the respective Y, U and V components, are executed in order to convert the packed YUV 4:2:2 source data into planar YUV 4:2:0 format data, thus providing color space conversion at a lower cost with reduced overhead.

Figure 7A:
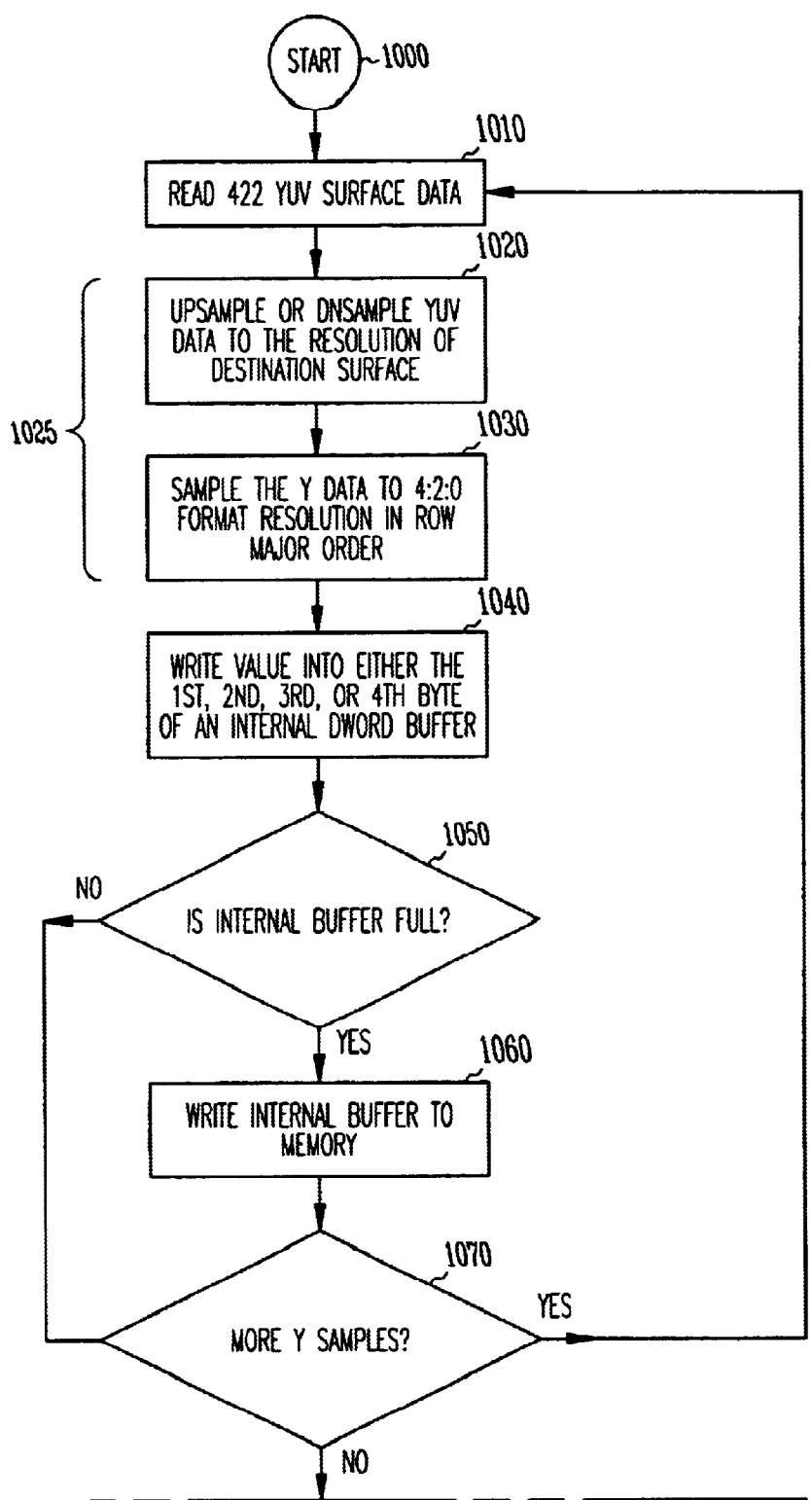
FIG. 7 shows an example flowchart of color space conversion from packed YUV 4:2:2 format to planar YUV 4:2:0 format according to an example embodiment of the present invention
Figure 7B:
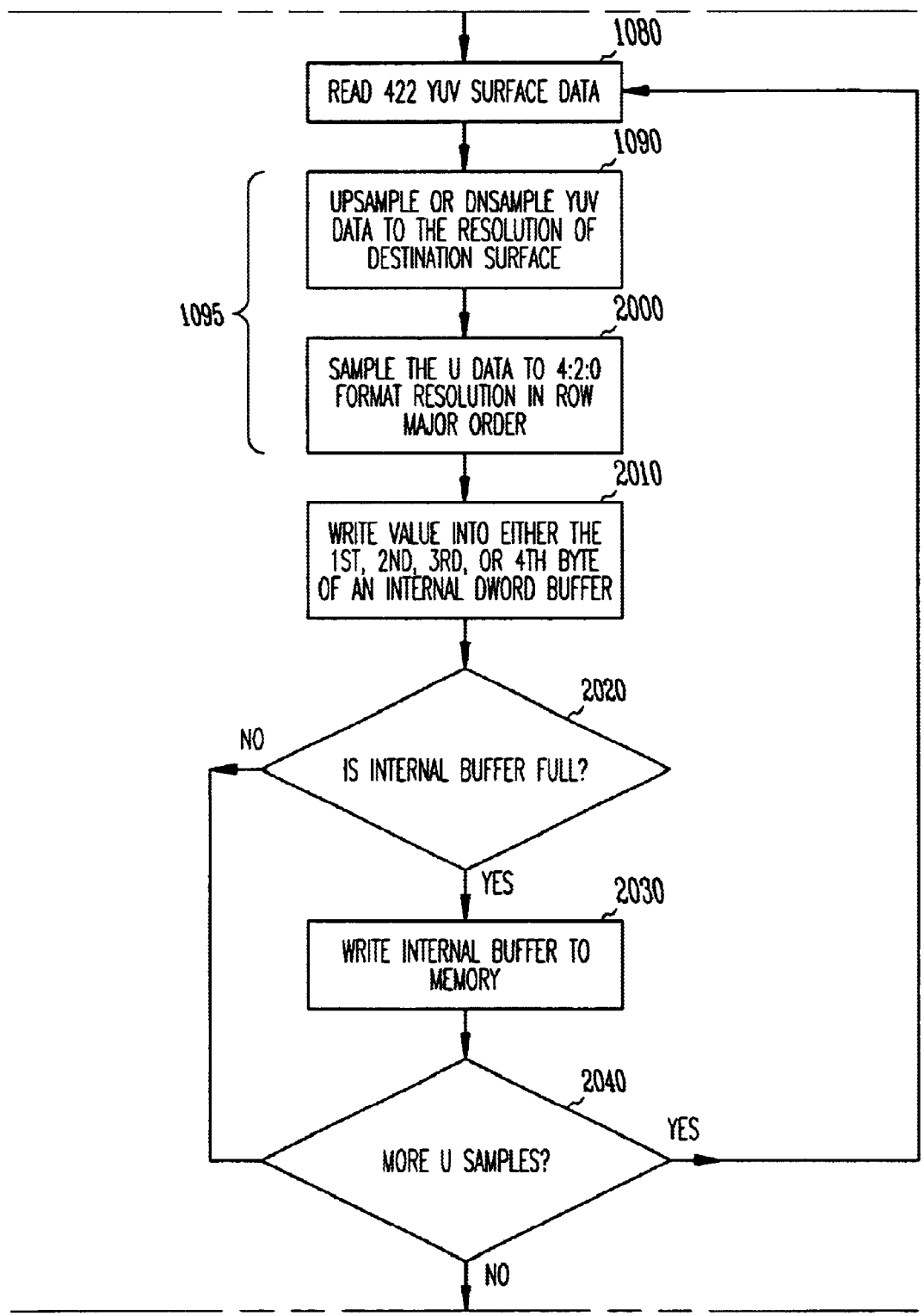
Figure 7C:
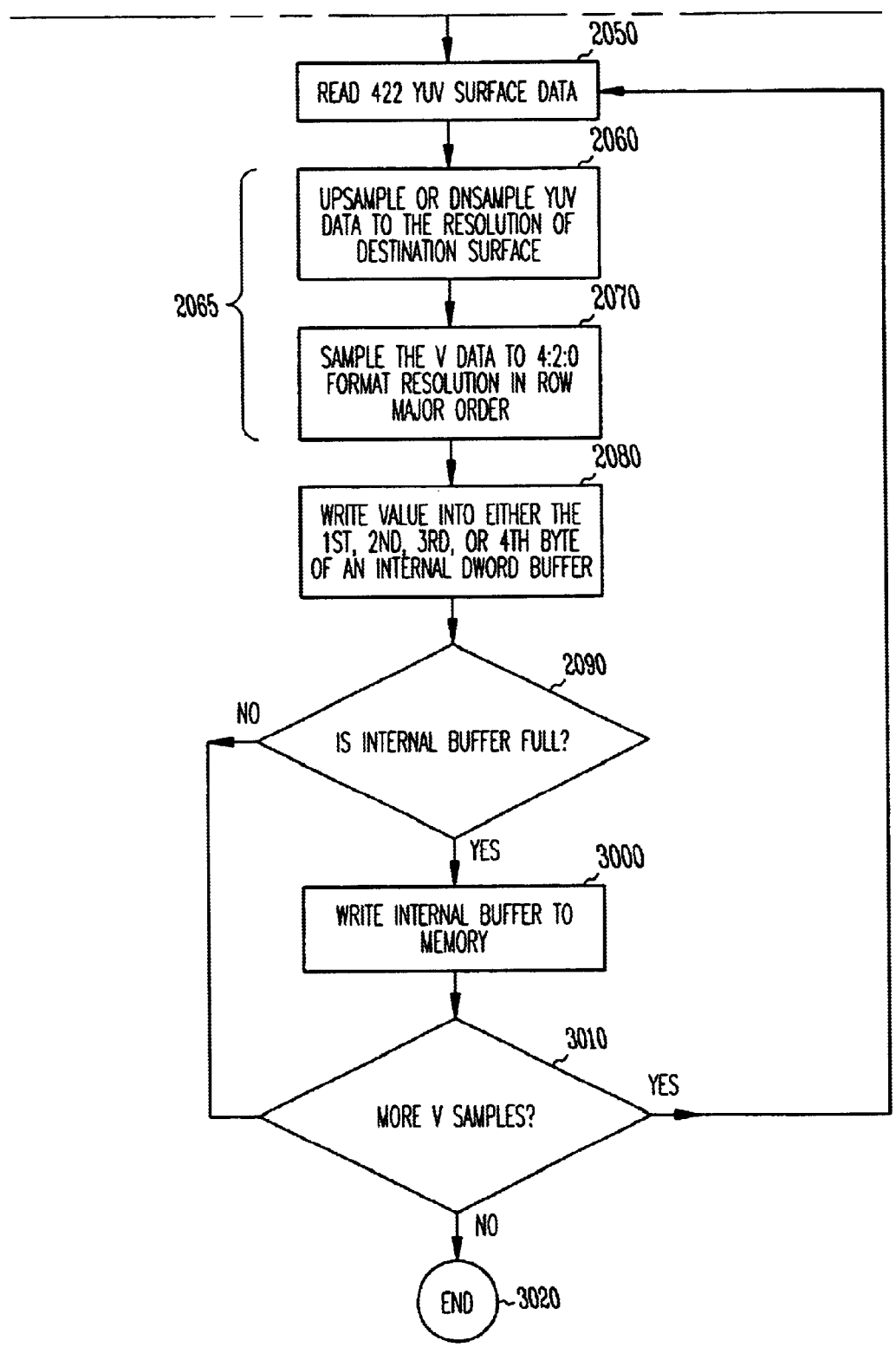

As shown in FIG. 7 which is a flow chart for the conversion of packed YUV 4:2:2 format data to planar 4:2:0 planar data, the YUV 4:2:2 format data is read (1010), and the read Y data is interpolated (1025) by utilizing the same interpolation formula or conversion formula $\{\alpha\mu_1-(1-\alpha)\mu_0\}$ described above to perform a combination of functions including upsampling or downsampling the data to the resolution of the destination surface (1020), and sampling the sample the Y data to the planar YUV 4:2:0 format resolution (1030). That is, to scale the packed YUV 4:2:2 format data to the planar YUV 4:2:0 format data, the interpolation formula or conversion formula $\{\alpha\mu_1-(1-\alpha)\mu_0\}$ is utilized to determine the interpolated Y value appropriate for the planar YUV 4:2:0 format (1025). However, in the present example, to which the present invention is not limited, no such sampling of the Y is necessary, since the Y values are the same for both the packed YUV 4:2:2 format data and the planar YUV 4:2:0 format data. Thus, Y values are written to a double word in an internal buffer in the form of a planar YUV 4:2:2 format. When all Y values have been written to the internal buffer, the buffer is then written to memory in planar YUV 4:2:0 format. Otherwise, the remaining Y values undergo the same processing described above (1070).

Figure 8:
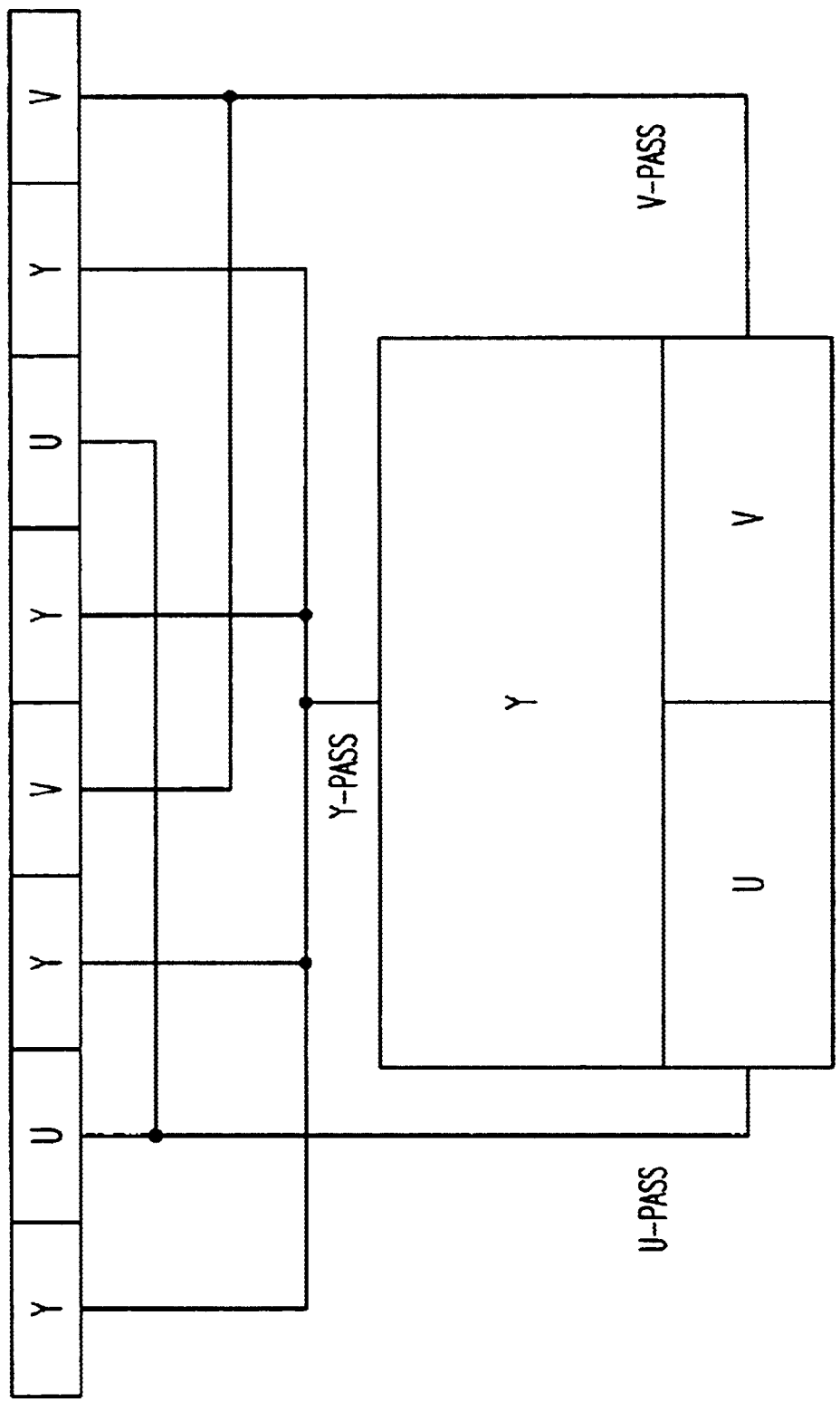
FIG. 8 shows an example conversion of packed YUV 4:2:2 data to planar YUV 4:2:0 format data, in accordance with an example embodiment of the present invention.

A U pass is executed as a bilinear filter reads the incoming U surface data (1080). Then, the read U data is interpolated (1095) by utilizing the interpolation formula or conversion formula $\{\alpha\mu_1-(1-\alpha)\mu_0\}$ to perform the combination of upsampling or downsampling the data to the resolution of the destination surface (1090), and sampling the sample the U data to the planar YUV 4:2:0 format resolution (2000). That is, as set forth above, to scale the packed YUV 4:2:2 format data to the planar YUV 4:2:0 format data, the interpolation formula or conversion formula $\{\alpha\mu_1-(1-\alpha)\mu_0\}$ is utilized to determine the interpolated U value appropriate for the planar YUV 4:2:0 format (1095). Then, U values are written to the double word in the internal buffer (2010). When the internal buffer is determined to be full (2020), the U data is written from the internal buffer to memory (2030. The writing of YUV data to the memory is shown in FIG. 8. Any further U samples undergo the same processing described above (2040).

A V pass is executed as a bilinear filter reads the incoming V surface data (2050). Then, the read V data is interpolated (2065) by utilizing the interpolation formula or conversion formula $\{\alpha\mu_1-(1-\alpha)\mu_0\}$ to perform the combination of upsampling or downsampling the data to the resolution of the destination surface (2060), and sampling the sample the V data to the planar YUV 4:2:0 format resolution (2070). That is, to scale the packed YUV 4:2:2 format data to the planar YUV 4:2:0 format data, the interpolation formula or conversion formula $\{\alpha\mu_1-(1-\alpha)\mu_0\}$ is utilized to determine the interpolated V value appropriate for the planar YUV 4:2:0 format (2065). Then, V values are written to the double word in the internal buffer (2080). The writing of YUV data to the memory is shown in FIG. 8. Any further V samples undergo the same processing described above (3010). Otherwise, the processing ends (3020).

Thus, similar to the conversion of planar YUV 4:2:0 format data to packed YUV 4:2:2 format data described above, an effect of scaling the YUV values by bilinear filtering is to produce data in the resolution of the destination surface, whereby each pixel is assigned one luminance (Y) and two chrominance samples (UV), although the respective values of YUV have been interpolated or converted as set forth above. Further, since the output is in planar YUV 4:2:0 format, only the values of one of the YUV components is selected, packed and written to the memory buffer, per pass. FIG. 8. illustrates three separate passes, including a Y-pass, a U-pass and a V-pass. That is, the bilinear filter performs the sampling interpolations according to the interpolation formula or conversion formula $\{\alpha\mu_1-(1-\alpha)\mu_0\}$ for each of the YUV components, and then performs a pass for all values of each of the respective YUV components. Thus, the converted planar YUV 4:2:0 format data is written in three separate surfaces, for the YUV components, respectively.

This concludes the description of the example embodiments. Although the present invention has been described with reference to illustrative embodiments thereof, it should be understood that numerous other modifications and embodiments can be devised by those skilled in the art that will fall within the scope and spirit of the principals of the invention. More particularly, reasonable variations and modifications are possible in the component parts and/or arrangements of the subject combination arrangement within the scope of the foregoing disclosure, the drawings and the appended claims without department from the spirit of the invention. In addition to variations and modifications in the component parts and/or arrangements, alternative uses will also be apparent to those skilled in the art.

What is claimed:

1. A method comprising:

performing conversion of samples of YUV (luminance and chrominance) components from a planar YUV 4:2:0 format to a racked YUV 4:2:2 format with the same or different surface resolutions based on successive passes of the different YUV components, wherein a successive pass includes the following, scaling a respective one component of a YUV sample to a destination resolution, wherein the YUV sample is scaled and sampled by an interpolation formula $\{\alpha\mu_1-(1-\alpha)\mu_0\}$, wherein "$\alpha$" indicates a pixel adjustment to align with the destination surface, $\mu_1$ is the value of the lower component value and $\mu_0$ is the value of the higher component value;

aligning the respective one component of the scaled YUV sample with a sampling point of the packed YUV 4:2:2 format; and writing said respective one component in the packed YUV 4:2:2 format.

2. The method according to claim 1, wherein the scaling and the aligning includes up-sampling or down-sampling the YUV sample in the planar YUV 4:2:0 format and adjusting a sampling point by a half pixel location to align with a sampling grid of the destination surface.

3. The method according to claim 2, wherein the incoming YUV data in the planar YUV 4:2:0 format is scaled to a destination resolution and is sampled to align with a sampling point of the packed YUV 4:2:2 format based on performing a pass for each of the Y, U and V components wherein the YUV components are written in the packed YUV 4:2:2 format.

4. The method according to claim 3, wherein the YUV components are written in the converted format utilizing byte masking.

5. The method according to claim 1, wherein the scaling, the aligning and the writing occur subsequent to decoding of the source data.

6. A circuit comprising:

a cache to read and store source data; and a filter to convert from a planar YUV 4:2:0 format to a packed YUV 4:2:2 format in a YUV (luminance and chrominance) color space based on a scale operation, an align operation and a write operation for YUV components of the YUV color space. wherein the scale operation is to scale a respective one component of a YUV sample of the source data to a destination resolution, wherein the filter is to sample the scaled YUV samples by an interpolation formula $\{\alpha\mu_1-(1-\alpha)\mu_0\}$, wherein "$\alpha$" indicates a pixel adjustment to align with the destination surface, $\mu_1$ is the value of the lower component value and $\mu_0$ is the value of the higher component value; the align operation to align the respective one component of the scaled YUV sample with a sampling point of the packed YUV 4:2:2 format; wherein the write operation is to write said respective one of said YUV components in the packed YUV 4:2:2 format.

7. A circuit according to claim 6, wherein the filter is to scale the UV samples based on an up-sampling operation and an adjust operation, wherein the up-sampling operation is to upscale incoming YUV data in a planar YUV 4:2:0 format and wherein the adjust operation is to adjust a sampling point by a half pixel location.

8. A circuit according to claim 7, wherein the filter is to up-sample the incoming YUV data in a planar YUV 4:2:0 format to a 4:4:4 format, wherein the filter is to write the YUV data in the 4:4:4 format in a packed YUV 4:2:2 destination format for the Y, U and V components.

9. A circuit according to claim 7, wherein the filter is to write the YUV components in the converted format based on a byte mask operation.

10. A circuit according to claim 6, wherein the filter is a bilinear which is to perform a bilinear filter of texture stream data.

11. A circuit according to claim 6, further comprising a decoder to decode the source data prior to when the cache is to store the source data.

12. A circuit comprising:

a texture cache to read source data; and a filter to sample UV (chrominance) samples in a vertical direction and to execute a separate pass for each respective Y, U and V component, wherein the filter is to scale the UV samples by an interpolation formula $\{\alpha\mu_1-(1-\alpha)\mu_0\}$, wherein "$\alpha$" indicates a pixel adjustment to align with the destination surface, $\mu_1$ is the value of the lower component value and $\mu_0$ is the value of the higher component value, and wherein the filter is to separately write each of the respective YUV components in a converted format prior to a separate write of a next one of the YUV components in the converted format.

13. A circuit according to claim 12, wherein the filter is a bilinear filter which is to perform a bilinear filter of texture stream data.

14. A circuit according to claim 12, further comprising a decoder to decode the source data prior to when the cache is to read the source data.

15. A method comprising:

scaling a first component of a YUV sample to a destination resolution, wherein the scaling comprises scaling and sampling said YUV sample based on an interpolation formula $\{\alpha\mu_1-(1-\alpha)\mu_0\}$, wherein "$\alpha$" indicates a pixel adjustment to align with the destination surface, $\mu_1$ is the value of the lower component value and $\mu_0$ is the value of the higher component value;

aligning the first component of the scaled YUV sample with a sampling point of a destination format;

writing said first component in the destination format;

scaling a second component of the YUV sample to the destination resolution;

aligning the second component of the scaled YUV sample with a sampling point of the destination format; and writing the second component in the destination format.

16. The method according to claim 15, further comprising writing a third component in the destination format.

17. The method according to claim 15, wherein the scaling, the aligning and the writing of the first component occur subsequent to decoding of the source data and prior to the scaling, the aligning and the writing of the second component.

18. A method comprising:

performing conversion of samples of YUV (luminance and chrominance) components from a source packed YUV 4:2:2 format to a destination planar YUV 4:2:0 format based on successive passes of the different YUY components, wherein a successive pass includes the following, scaling a respective one component of a YUV sample to a destination resolution, wherein the YUV sample is scaled and sampled by an interpolation formula $\{\alpha\mu_1-(1-\alpha)\mu_0\}$, wherein "$\alpha$" indicates a pixel adjustment to align with the destination surface, $\mu_1$ is the value of the lower component value and $\mu_0$ is the value of the higher component value;

aligning the respective one component of the scaled YUV sample with a sampling point of the destination planar YUV 4:2:0 format; and writing said respective one component in the destination planar YUV 4:2:0 format.

19. The method according to claim 18, wherein said scaling and aligning includes up-sampling or down-sampling of the incoming YUV data in the packed YUV 4:2:2 format and adjusting a sampling point by a half pixel location to a sampling grid of the destination format.

20. The method according to claim 19, wherein the incoming YUV data in the packed YUV 4:2:2 format is scaled to a destination resolution and is then sampled to align with a sampling point of a 4:2:0 destination format by performing a pass for each of said Y, U and V components.

21. A circuit comprising:

a cache to read and store source data; and a filter to convert from a packed YUV 4:2:2 format to a planar YUV 4:2:0 format in a YUV (luminance and chrominance) color space based on a scale operation, an align operation and a write operation for YUV components of the YUV color space, wherein the scale operation is to scale a respective one component of a YUV sample of the source data to a destination resolution, wherein the filter is to sample the scaled YUV samples by an interpolation formula $\{\alpha\mu_1-(1-\alpha)\mu_0\}$, wherein "$\alpha$" indicates a pixel adjustment to align with the destination surface, $\mu_1$ is the value of the lower component value and $\mu_0$ is the value of the higher component value; the align operation to align the respective one component of the scaled YUV sample with a sampling point of the planar YUV 4:2:0 format, wherein the write operation is to write said respective one of said YUV components in the planar YUV 4:2:0 format.

22. A circuit according to claim 21, wherein said filter is to scale the UV samples by an up-sample operation of the incoming YUV data in a packed YUV 4:2:2 format and an adjust operation of a sampling point by a half pixel location.

23. A circuit according to claim 22, wherein the Y components are the same for both the planar YUV 4:2:0 format and the packed YUV 4:2:2 format.

24. A circuit according to claim 22, wherein the incoming YUV data in the packed 4:2:2 format is up-sampled to a 4:4:4 format and is then written in the planar 4:2:0 format by executing a pass for each of said respective Y, U and V components.

25. A circuit according to claim 22, wherein the filter is a bilinear which is to perform a bilinear filter of texture stream data.

26. A system comprising:

a universal serial bus port to receive source data that includes YUV (luminance and chrominance) components of a first format within a YUV color space;

a memory to store the received source data; and a filter is to convert the YUV components of the first format to YUV components to a destination format based on a scale operation, a sample operation, an align operation and a write operation, wherein the filter is to perform the scale operation, the sample operation, the align operation and the write operation separately for the different YUV components, wherein for the scale operation the filter is to scale data from the received source data that is associated with one of the YUV components to a destination resolution, and wherein for the sample operation the filter is to sample the scaled data by an interpolation formula $\{\alpha\mu_1-(1-\alpha)\mu_0\}$, wherein "$\alpha$" indicates a pixel adjustment to align with the destination surface, $\mu_1$ is the value of the lower component value and $\mu_0$ is the value of the higher component value.

27. The system of claim 26, wherein for the align operation, the filter is to align the scaled data associated with one of the YUV components with a sampling point of the destination format.

28. The system of claim 27, wherein for the write operation, the filter is to write the aligned scaled data associated with one of the YUV components in the destination format.

29. A machine-readable medium that provides instructions, which when executed by a machine, cause said machine to perform operations comprising:

performing conversion of samples of YUV (luminance and chrominance) components from a planar YUV 4:2:0 format to a packed YUV 4:2:2 format with the same or different surface resolutions based on successive passes of the different YUV components, wherein a successive pass includes the following, scaling a respective one component of a YUV sample to a destination resolution, wherein the YUV sample is scaled and sampled by an interpolation formula $\{\alpha\mu_1-(1-\alpha)\mu_0\}$, wherein "$\alpha$" indicates a pixel adjustment to align with the destination surface, $\mu_1$ is the value of the lower component value and $\mu_0$ is the value of the higher component value;

aligning the respective one component of the scaled YUV sample with a sampling point of the packed YUV 4:2:2 format; and writing said respective one component in the packed YUV 4:2:2 format.

30. The machine-readable medium according to claim 29, wherein the scaling and the aligning includes up-sampling or down-sampling the YUV sample in the planar YUV 4:2:0 format and adjusting a sampling point by a half pixel location to align with a sampling grid of the destination surface.

31. The machine-readable medium according to claim 30, wherein the incoming YUV data in the planar YUV 4:2:0 format is scaled to a destination resolution and is sampled to align with a sampling point of the packed YUV 4:2:2 format based on performing a pass for each of the Y, U and V components wherein the YUV components are written in the packed YUV 4:2:2 format.

32. The machine-readable medium according to claim 31, wherein the YUV components are written in the converted format utilizing byte masking.

33. The machine-readable medium according to claim 29, wherein the scaling, the aligning and the writing occur subsequent to decoding of the source data.

34. A machine-readable medium that provides instructions, which when executed by a machine, cause said machine to perform operations comprising:

scaling a first component of a YUV sample to a destination resolution, wherein the scaling comprises scaling and sampling said YUV sample based on an interpolation formula $\{\alpha\mu_1-(1-\alpha)\mu_0\}$, wherein "$\alpha$" indicates a pixel adjustment to align with the destination surface, $\mu_1$ is the value of the lower component value and $\mu_0$ is the value of the higher component value;

aligning the first component of the scaled YUV sample with a sampling point of a destination format;

writing said first component in the destination format;

scaling a second component of the YUV sample to the destination resolution;

aligning the second component of the scaled YUV sample with a sampling point of the destination format; and writing the second component in the destination format.

35. The machine-readable medium according to claim 34, further comprising writing a third component in the destination format.

36. The machine-readable medium according to claim 34, wherein the scaling, the aligning and the writing of the first component occur subsequent to decoding of the source data and prior to the scaling, the aligning and the writing of the second component.

37. A machine-readable medium that provides instructions, which when executed by a machine, cause said machine to perform operations comprising:

performing conversion of samples of YUV (luminance and chrominance) components from a source packed YUV 4:2:2 format to a destination planar YUV 4:2:0 format based on successive passes of the different YUV components, wherein a successive pass includes the following, scaling a respective one component of a YUV sample to a destination resolution, wherein the YUV sample is scaled and sampled by an interpolation formula $\{\alpha\mu_1-(1-\alpha)\mu_0\}$, wherein "$\alpha$" indicates a pixel adjustment to align with the destination surface, $\mu_1$ is the value of the lower component value and $\mu_0$ is the value of the higher component value;

aligning the respective one component of the scaled YUV sample with a sampling point of the destination planar YUV 4:2:0 format; and writing said respective one component in the destination planar YUV 4:2:0 format.

38. The machine-readable medium according to claim 37, wherein said scaling and aligning includes up-sampling or down-sampling of the incoming YUV data in the packed YUV 4:2:2 format and adjusting a sampling point by a half pixel location to a sampling grid of the destination format.

39. The machine-readable medium according to claim 38, wherein the incoming YUV data in the packed YUV 4:2:2 format is scaled to a destination resolution and is then sampled to align with a sampling point of a 4:2:0 destination format by performing a pass for each of said Y, U and V components.

\* \* \* \* \*

UNITED STATES PATENT AND TRADEMARK OFFICE
CERTIFICATE OF CORRECTION

PATENT NO.    : 6,674,479 B2
DATED         : January 6, 2004
INVENTOR(S)   : Cook et al.

It is certified that error appears in the above-identified patent and that said Letters Patent is hereby corrected as shown below:

<u>Column 11,</u>
Line 5, delete "racked" and insert -- packed --, therefor.
Line 45, delete "space." and insert -- space --, therefor.

<u>Column 12,</u>
Line 60, delete "YUY" and insert -- YUV --, therefor.

Signed and Sealed this

Eighth Day of June, 2004

JON W. DUDAS
*Acting Director of the United States Patent and Trademark Office*